No. 697,305. Patented Apr. 8, 1902.
W. A. WILEY.
POTATO PICK-UP.
(Application filed May 14, 1901.)
(No Model.)
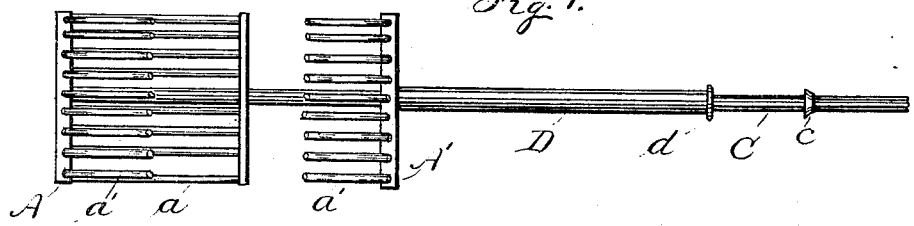
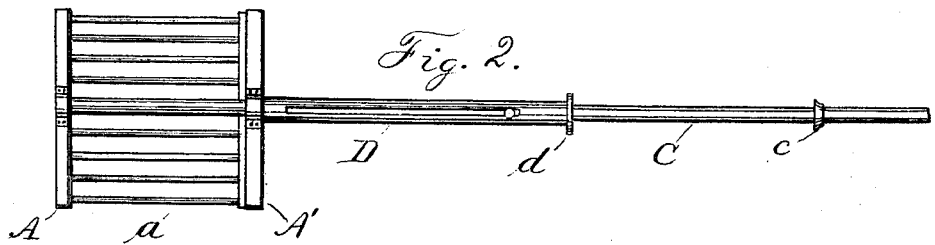
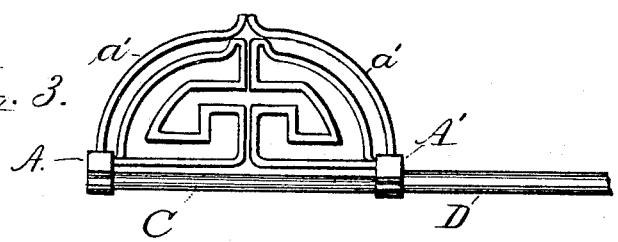
WITNESSES:
INVENTOR
William A. Wiley
BY
Thomas P. Simpson
ATTORNEY

UNITED STATES PATENT OFFICE.

WILLIAM A. WILEY, OF ROCHESTER, MINNESOTA.

POTATO PICK-UP.

SPECIFICATION forming part of Letters Patent No. 697,305, dated April 8, 1902.

Application filed May 14, 1901. Serial No. 60,205. (No model.)

*To all whom it may concern:*

Be it known that I, WILLIAM A. WILEY, a citizen of the United States, residing at Rochester, in the county of Olmsted and State of Minnesota, have invented certain new and useful Improvements in Potato Pick-Ups; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a potato pick-up which will first rake the potatoes from the ground, then inclose them in a wire basket, and finally sift the dirt from them as the basket is being lifted from the ground.

Figure 1 of the drawings is a plan view showing the two jaws when one has been moved up on the handle. Fig. 2 is a bottom view. Fig. 3 is a side elevation.

In the drawings, A represents the jaw which is fixed on the lower end of a handle C, while A' is a jaw which is attached to a tube D, so that both may slide up and down on the handle. The tube D has a collar $d$, which abuts against the stop $c$ on handle to limit the extent of its sliding motion. Both jaws have curved teeth parallel to each other and secured at one end in a suitable head, the concavities of these jaw-teeth being opposite to each other, while each has also a wire frame at the side, so that both the teeth and sides will come together and form a covered basket, the cover being formed by the longitudinal wires $a$, whose ends are secured in a cross-bar and in the rake-head. $a'$ represents the wire frames at the side.

After a row of potatoes has been turned out with the plow the operator draws back the jaw A' and with the jaw A rakes the upturned potatoes into its concavity, then slides down the jaw A' to inclose them. As the jaws forming the basket are lifted up to empty the potatoes into some receptacle the dirt sifts out between the wires.

Having thus described all that is necessary to a full understanding of my invention, what I claim as new, and desire to protect by Letters Patent, is—

A potato pick-up consisting of two wire-mesh jaws, one fixed at the lower end of the handle and the other adapted to slide thereon, the whole operating in the manner and for the purpose set forth.

In testimony whereof I affix my signature in presence of two witnesses.

WILLIAM A. WILEY.

Witnesses:
 H. M. NOWELL,
 R. C. NOWELL.